US005524059A

United States Patent [19]

Zurcher

[11] Patent Number: 5,524,059
[45] Date of Patent: Jun. 4, 1996

[54] SOUND ACQUISITION METHOD AND SYSTEM, AND SOUND ACQUISITION AND REPRODUCTION APPARATUS

[75] Inventor: Frederic Zurcher, Lannion, France

[73] Assignee: Prescom, Saint Quentin en Yvelines, France

[21] Appl. No.: 211,401

[22] PCT Filed: Oct. 2, 1992

[86] PCT No.: PCT/FR92/00919

§ 371 Date: Apr. 1, 1994

§ 102(e) Date: Apr. 1, 1994

[87] PCT Pub. No.: WO93/07730

PCT Pub. Date: Apr. 15, 1993

[30] Foreign Application Priority Data

Oct. 2, 1991 [FR] France .................................. 91 12125

[51] Int. Cl.$^{6}$ ............................ H04R 3/00; H04R 25/00; H04M 3/42

[52] U.S. Cl. ............................ 381/92; 381/155; 379/202

[58] Field of Search ................................ 381/92, 93, 95, 381/82, 205, 187, 77, 168, 169, 155, 72; 379/202, 203, 204, 205, 206

[56] References Cited

U.S. PATENT DOCUMENTS

| | | | |
|---|---|---|---|
| 3,694,578 | 9/1972 | Reid | 381/77 |
| 4,078,155 | 3/1978 | Botros et al. | 381/83 |
| 4,184,048 | 1/1980 | Alcaide | 381/83 |
| 4,348,549 | 9/1982 | Berlant . | |
| 4,434,507 | 2/1984 | Thomas | 381/92 |
| 4,837,829 | 6/1989 | Lobb | 381/83 |
| 4,965,786 | 10/1990 | Salle . | |

FOREIGN PATENT DOCUMENTS

| | | | |
|---|---|---|---|
| 417498 | 5/1990 | Japan | 381/155 |

*Primary Examiner*—Curtis Kuntz
*Assistant Examiner*—Xu Mei
*Attorney, Agent, or Firm*—Young & Thompson

[57] ABSTRACT

Several microphones (M1, M3) are arranged substantially in the same plane (P) and are distributed symmetrically with respect to a direction of symmetry (D) perpendicular to this plane (P). A phase shift is applied between the signals output respectively by different microphones (M1, M3) and the signals thus phase shifted are added, in such a way as substantially to cancel the signals relating to any sound wave arriving in phase and with the same intensity on each of the microphones (M1, M3).

16 Claims, 4 Drawing Sheets

FIG. 2
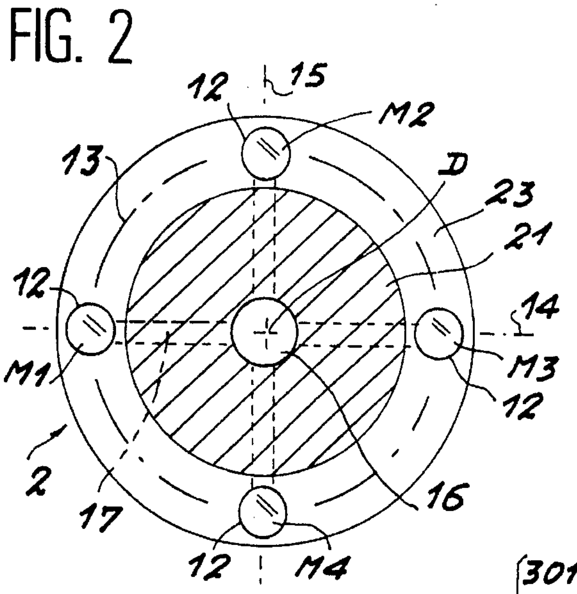
FIG. 10
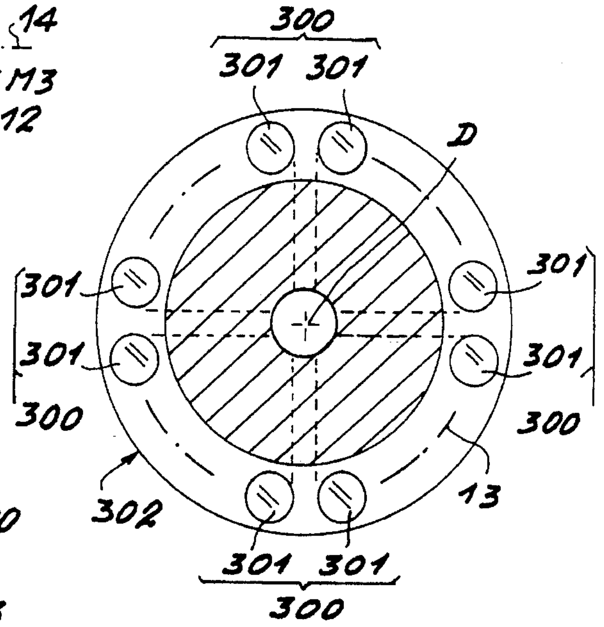
FIG. 8
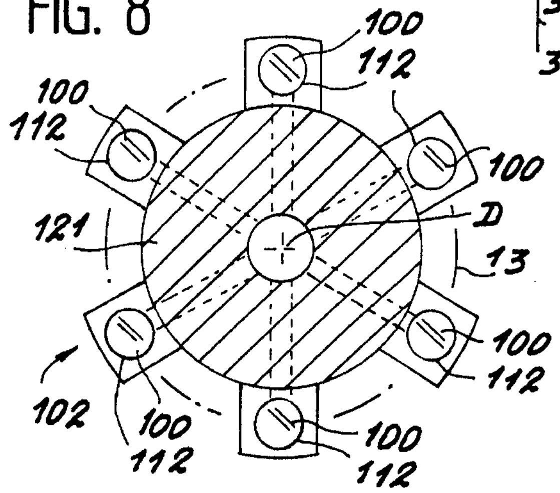
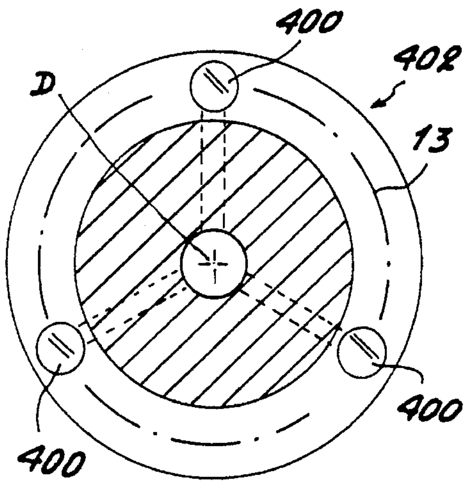
FIG. 11
FIG. 9
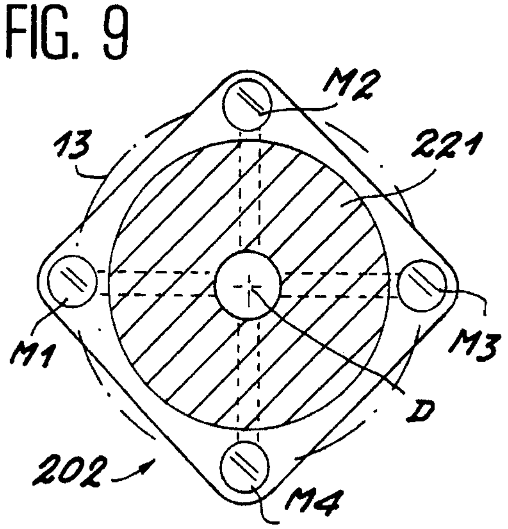

SOUND ACQUISITION METHOD AND SYSTEM, AND SOUND ACQUISITION AND REPRODUCTION APPARATUS

BACKGROUND OF THE INVENTION

1. Field of the Invention

The present invention relates to a sound acquisition method and system. The invention also relates to a sound acquisition and reproduction apparatus employing this method.

2. Description of the Related Art

The present invention has a main application in the field of audioconferencing, in which a sound acquisition and reproduction device is comprised in a single assembly of relatively small dimensions. This assembly must be able to be stood easily on a table and operate in any room without the necessity for acoustic treatment of these premises. It is desirable that it can be used by a person having great freedom of movement within a radius of at least 4 m around the device, while carrying on the conversation with his correspondent in normal comfortable listening conditions for the two correspondents.

Preferably, it may also be used by any number of persons assembled in the same premises and distributed around the item of furniture on which the device is stood. In order to obtain these results, four conditions are sought:

1. The device must be associated with two automatic level regulators which ensure that the correct level of a signal is sent to line, whatever the acoustic power gathered by the microphone(s) of the device, depending on the position of the speaker(s) with respect to this microphone or these microphones, and that the correct level of signal is sent to the loudspeaker(s), whatever the attenuation applied by the line.

2. The sound reproduced by the loudspeaker(s) must be perceived with sufficient listening comfort independently of the position occupied by the listener(s) in the premises.

3. The sound gathered by the microphone(s) must keep sufficiently stable qualities of clarity, of cleanliness and be pleasant to listen to, whatever the position of the speaker(s) with respect to the device, and whatever the configuration of the premises.

4. The device must exhibit good acoustic decoupling between the loudspeaker(s) and the microphone(s) so as to be able to ensure a sufficiently high sound listening level without causing the LARSEN effect, but also in order to send the least possible acoustic echo to the distant correspondent.

Operational devices satisfying condition 1 are currently known.

For example, devices exist which favor condition 4 by using a single microphone and four loudspeakers oriented along four directions spaced by an angle of 90° from one another, and driven in phase opposition in pairs. This method makes it possible effectively to obtain low coupling since the microphone is placed at a point which is a center of symmetry with respect to the loudspeakers. As the latter are driven in phase opposition in pairs, and providing that they have identical characteristics, the sound originating from the loudspeakers gathered by the microphone will be very weak and thus the decoupling will be very good.

However, this type of device badly fulfills conditions 2 (because of the phase shifts of 180° between loudspeakers, the radiation diagram of the set of loudspeakers will not be circular in the horizontal plane and will depend strongly on the frequencies emitted) and 3 (since the microphone picks up the direct sounds and the indirect, reflected sounds indifferently, which means that the quality of the sound picked up by the microphone depends too greatly on the position of the speaker in the premises and on the configuration of these premises).

SUMMARY AND OBJECTS OF THE INVENTION

One main object of the present invention is to propose a sound acquisition method and an apparatus which give rise to low sensitivity to the sounds arriving along a predetermined direction.

Another object of the invention is that, in a plane perpendicular to the predetermined direction, a sensitivity is obtained varying relatively little as a function of the direction from which the sounds arrive and as a function of the frequency components of these sounds.

In the context of the preferred, although not limiting, use of the invention for an audioconferencing device with sound acquisition and reproduction, the achievement of the above object would then make it possible, by orienting one or more loudspeakers along the said predetermined direction, fully to satisfy condition 3 above, while satisfying conditions 1, 2 and 4 at least as well as the devices of the prior art.

Thus the invention proposes a sound acquistion method using several sound reception devices, characterized in that the sound reception devices are arranged substantially in the same plane and they are distributed symmetrically with respect to a direction of symmetry perpendicular to this plane, a phase shift is applied between the signals output respectively by various sound reception devices, and the signals thus phase shifted are added in such a way as substantially to cancel the signals relating to any sound wave arriving in phase and with the same intensity on each of the sound reception devices.

By virtue of the symmetric arrangement of the sound reception devices, the sounds incident along the direction of symmetry reach them in phase and with the same intensity. Consequently, due to the phase shifts applied and to the addition of the phase-shifted signals, these sounds incident along the direction of symmetry are substantially eliminated after processing. In contrast, the sounds incident perpendicularly to the direction of symmetry reach the various reception devices with phase and/or amplitude differences between these devices. These sounds are thus preserved and correctly taken into account.

According to a preferred version of the method of the invention, an even number of sound reception devices are used, which are associated in pairs, the sound reception devices of each pair being arranged symmetrically with respect to the direction of symmetry, and one of the signals output respectively by the sound reception devices of each pair is subtracted from the other, so as to add them with a phase shift of 180° between them.

Hence, the sounds incident along the direction of symmetry, as well as sundry interference can be eliminated effectively by simple subtraction of the signals output respectively by the reception devices of each pair. This subtraction may advantageously be performed jointly with preamplification by means of a differential preamplifier linked to the output of the reception devices of each pair.

In a preferred way, in the above method, 2n sound reception devices are used, associated in pairs and arranged at regular intervals along a circumference centered on the direction of symmetry, n designating a whole number at least equal to two, and a phase shift of 360°/2n is applied between the signals output respectively by any two adjacent sound reception devices. These features make it possible to obtain a radiation diagram which is regular in a plane perpendicular to the direction of symmetry. In principle, the higher the number n of pairs of sound reception devices, the more homogenous is the radiation diagram in the plane perpendicular to the direction of symmetry. In practice, it is noted that with two pairs of reception devices, it is possible to obtain an excellent compromise between this homogeneity and the cost of the components used.

According to a second object, the invention proposes a sound acquisition system comprising several sound reception devices and processing means for processing the signals output by the sound reception devices, characterized in that the sound reception devices are situated substantially in the same plane and are distributed symmetrically with respect to a direction of symmetry, and in that the processing means are configured to apply a phase shift between the signals output by the various sound reception devices and to add the signals thus phase shifted, in such a way as substantially to cancel the signals relating to any sound wave arriving in phase and with the same intensity on each of the sound reception devices.

This apparatus is designed for implementing the method set out above.

According to a third object, the invention proposes a sound acquisition and reproduction apparatus comprising at least one loudspeaker oriented along a direction of symmetry and sound acquisition means, characterized in that the sound acquisition means comprise a system in accordance with the second object of the invention, with the direction of symmetry of the system identical to the direction of orientation of the loudspeaker.

This appliance can be used for audioconferences and very satisfactorily fulfills the criteria 1 to 4 enumerated at the start.

BRIEF DESCRIPTION OF THE DRAWINGS

Other features and advantages of the present invention appear in the detailed description below of illustrative embodiments, read jointly with the attached drawings in which:

FIG. 2 represents a sectional view of a part of the apparatus represented in FIG. 1, taken along the plane II—II indicated in FIG. 1;

FIGS. 8 to 11 are views similar to FIG. 2 representing variants of the apparatus according to the invention.

DESCRIPTION OF THE PREFERRED EMBODIMENTS

In the illustrative embodiments which will now be described, reference will be made to an apparatus for sound acquisition and reproduction of the "free hands" type, which can be used in the field of audioconferencing, which constitutes a preferred application of the method of the present invention. However, it will be clearly apparent to the person skilled in the art that the sound acquisition part of this apparatus in itself exhibits inventive characteristics which render it directly applicable in other types of sound acquisition systems.

Figure 1:
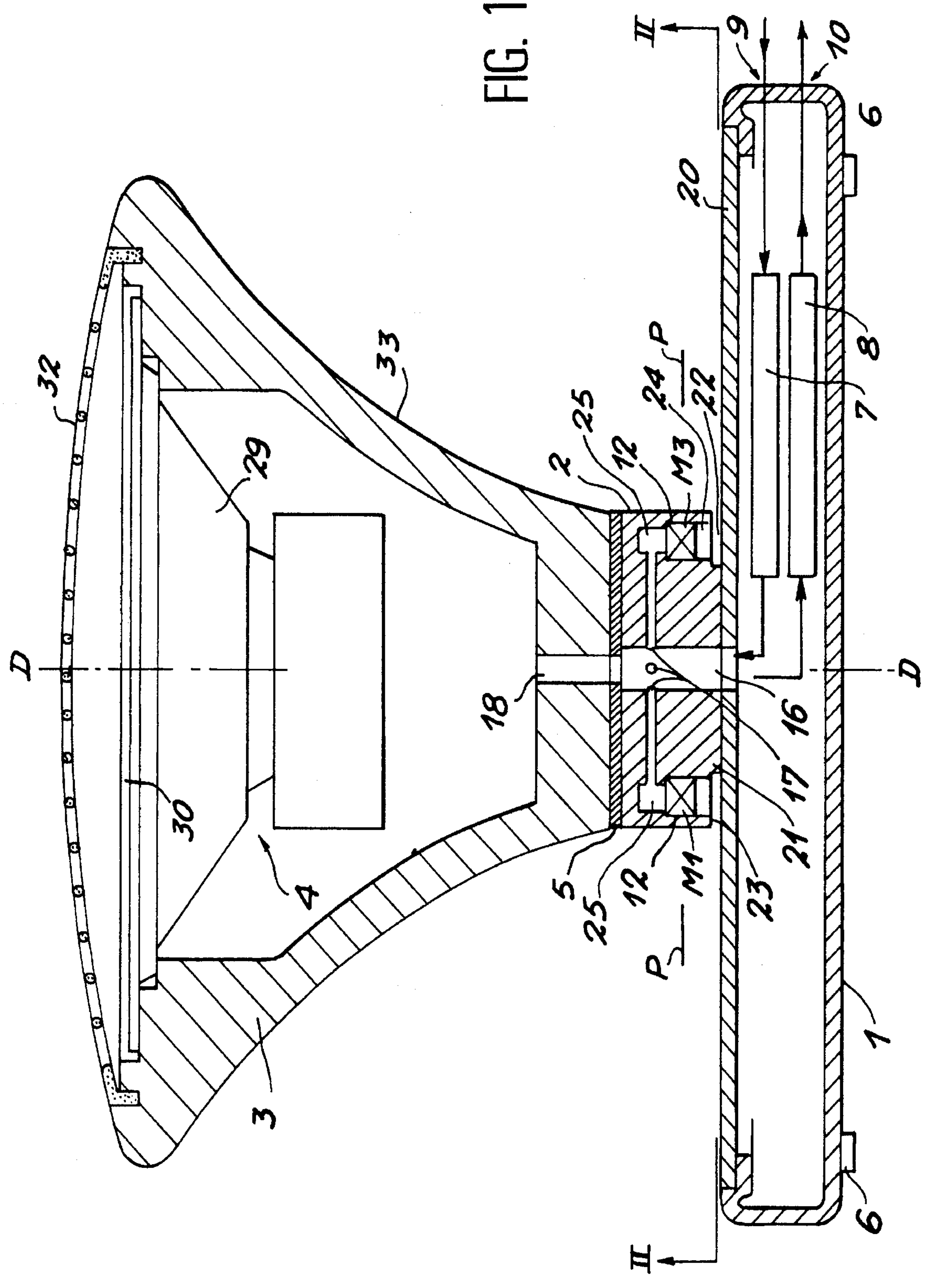
FIG. 1 represents an axial sectional view of an apparatus in accordance with the present invention.

With reference to FIGS. 1 and 2, the apparatus according to the invention includes a box 1, a body 2 in which are housed several sound reception devices M1, M2, M3, M4, and an element 3 in which a loudspeaker 4 is mounted. The body 2 and the element 3 have a general shape of revolution around a direction of symmetry D. The element 3 is mounted on the body 2 which is itself mounted on the box 1. Sound insulating and/or mechanically damping materials such as 5 may be interposed between the element 3 and the body 2, or even between the body 2 and the upper part of the box 1. In general, the apparatus has a symmetrical structure around the direction D so as to minimize the effect of the mechanical vibrations which may affect the signals produced by the microphones M1, M2, M3, M4.

The box 1, at its lower part, has feet 6 made of rubber or the like for standing the apparatus on a horizontal surface such as a table. The direction of symmetry D is then vertical. The electrical circuits 7, 8 are mounted within the box 1. These circuits can be connected as indicated diagrammatically at 9, 10 of FIG. 1, to an external audioconferencing system, not represented, with which the apparatus according to the invention functions. These circuits comprise an amplification circuit 7 which receives the signals output by the audioconferencing system and outputs them in amplified form to the loudspeaker 4 so that the latter emits the corresponding sounds, and processing means 8 for processing the signals output by the sound reception devices M1, M2, M3, M4 and output them after processing to the audioconferencing system. In a known way, the amplification circuit 7 may, in order to enhance the listening comfort, include an electronic cell for correcting the response curve of the loudspeaker 4, especially to boost the low frequencies and suppress possible resonances or anti-resonances. Moreover, conventional echo cancellation means are generally mounted between the circuits 7 and 8.

In the example represented, there are four sound reception devices, each consisting of a single microphone M1, M2, M3, M4. These four microphones M1, M2, M3, M4 are all arranged in the same horizontal plane P perpendicular to the direction of symmetry D.

As can be seen in FIG. 2, the four microphones M1, M2, M3, M4 are distributed symmetrically with respect to the direction of symmetry D, which is perpendicular to the plane of FIG. 2. These four microphones are situated on a circumference 13 parallel to the plane P and centered on the direction of symmetry D. These four microphones are associated in pairs, respectively M1, M3 and M2, M4, the microphones of each pair being arranged symmetrically with respect to the direction of symmetries D, and the two pairs of microphones being arranged along two radial lines 14, 15 forming a right angle between them.

Each of the microphones M1, M2, M3, M4 is housed in a respective cavity 12 machined into the body 2. This body 2 is metal, for example of brass. It is traversed by an axial bore 16 along the direction of symmetry D, and it further includes four radial bores 17, each extending between the axial bore 16 and one of the four cavities 12. The axial bore 16 serves for passing connecting wires (not represented) from the loudspeaker 4 to the amplification circuit 7, with a corresponding bore 18 provided at the base of the element 3. The axial bore 16 and the four radial bores 17 serve for passing connecting wires (not represented) of the microphones M1, M2, M3, M4, to the processing means 8 situated in the box 1.

The four microphones M1, M2, M3, M4 are of the capacitor type, and are of small dimensions (for example a cylindrical shape of 6 mm diameter and of 4.5 mm height). It is known, for a given manufacturing series, that such microphones exhibit substantially the same response curve, with a deviation between them not exceeding 3 to 4 decibels. For producing the apparatus, it is thus easy to sort four microphones having identical response curves, to within a predetermined tolerance (for example 0.5 decibel).

The body 2 is mounted on a planar metal plate 20, parallel to the plane P of the microphones and constituting the upper face of the box 1. The cylindrical body 2 includes an axial cylindrical elongation 21, of smaller diameter which bears on this planar plate 20 and which defines a spacing 22 between the planar plate 20 and the surface 23 of the body 2 which is parallel to the plane P, and on which the machined cavities 12 open out. The elongation 21 of the body 2 affords a certain acoustic isolation between the microphones M1, M2, M3, M4 with respect to sounds arriving in a plane perpendicular to the direction of symmetry D. As can be seen in FIG. 1, the cavities 12 have an axial height greater than the height of the cylinders of the microphones M1, M2, M3, M4, and the latter are set into their respective cavities 12 in such a way as to leave a gap 24 between the side of each microphone facing the plate 20 and the surface 23 defining the edge of the cavities 12.

To the rear of the microphone M1, M2, M3, M4 each cavity 12 is extended into a part 25 of smaller diameter which defines a shoulder against which the rear face of the microphone bears, and into which the radial bore 17 opens out, thus giving a space for the connecting wires, not represented.

The element 3 mounted above the body 2 forms a sounding box for the loudspeaker 4. The loudspeaker 4 is mounted in the element 3 on the direction of symmetry D, and oriented along this direction of symmetry D, opposite to the plane P where the microphones M1, M2, M3, M4 are situated. That means that the membrane 29 of the loudspeaker 4, which has a shape of revolution about an axis, is arranged in the element 3 in such a way that this axis coincides with the direction of symmetry D of the apparatus, the outer edge 30 of this membrane 29 being situated in a plane perpendicular to the direction of symmetry D. For an application to audioconferencing, this outer edge 30 of the membrane 29 lies typically between 100 and 150 mm above the horizontal surface on which the apparatus is standing. A protective grille 32 is mounted at the upper part of the element 3 in order to protect the membrane 29 of the loudspeaker 4.

The outer peripheral surface 33 of the element 3 has a concave curvature and is connected tangentially to the outer peripheral surface of the body 2, this outer peripheral surface of the body 2 being a cylinder defined by generators substantially parallel to the direction of symmetry D.

Figure 3:
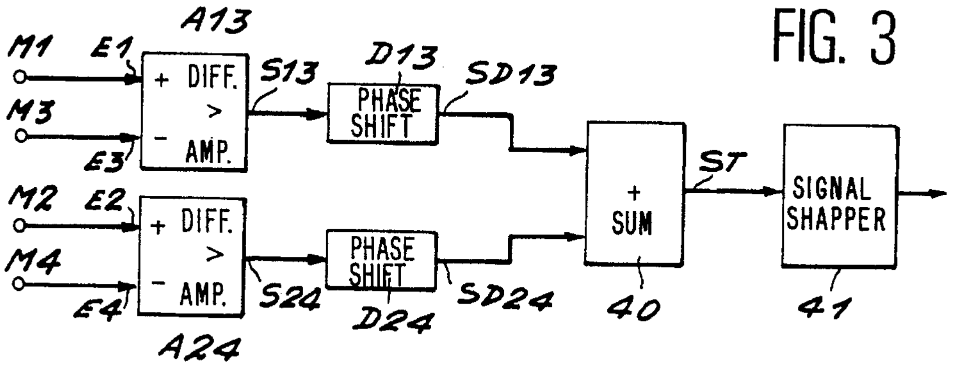
FIG. 3 represents an overall diagram of the means of processing the sounds picked up by the microphones of the apparatus of FIGS. 1 and 2.

The means 8 for processing the signals output by the microphones M1, M2, M3, M4 are represented diagrammatically in FIG. 3. These processing means comprise, on the one hand, two differential preamplifiers A13, A24 and two phase-shifter channels D13, D24 for applying a phase shift between the signals output respectively from the various microphones, and, on the other hand, an adder circuit 40 provided to create the sum of the phase-shifted signals output by the phase-shifter channels D13, D24. At the output of the adder circuit 40 is mounted a circuit 41 which shapes the signals for the purpose of transmitting them to the external audioconferencing system. In accordance with the invention, the phase shifts applied and the addition performed are such that the signals relating to any sound wave arriving in phase and with the same intensity on each of the microphones M1, M2, M3, M4 are substantially cancelled at the output of the adder circuit 40. In particular, when the apparatus is standing horizontally on a table, the sounds emitted by the loudspeaker 4 and reflected by the horizontal ceiling situated above the apparatus arrive on the four microphones along the direction of symmetry D and, having regard to the symmetric arrangement of the microphones, exhibit identical phase and intensity on each of the microphones. Consequently, these reflected signals are advantageously eliminated from the output signal of the processing circuit 8. Moreover, the symmetric structure of the sound acquisition system ensures that the mechanical vibrations of the apparatus will reach each of the microphones in an identical way. Consequently, the effect of these vibrations on the microphones is also eliminated from the output signal of the processing circuit 8.

In the example represented in FIG. 3, a differential preamplifier A13 (A24 respectively) includes two inputs E1, E3 (E2, E4 respectively) each linked to one of the microphones M1, M3 (M2, M4 respectively) of a pair of microphones arranged in diametrically opposite position with respect to the direction of symmetry D. The differential preamplifiers A13, A24 perform preamplification of the output signals from the microphones, eliminate certain interference present in these output signals, and produce output signals S13 and S24 which are proportional to the difference between the input signals which they receive from the microphones. In other words, each differential preamplifier A13 (A24 respectively) applies a phase shift of 180° between the signals output by the microphones M1, M3 (M2, M4 respectively) and adds the signals thus phase shifted, which substantially cancels the signals relating to any sound wave arriving in phase and with the same intensity on each of the microphones M1, M3 (M2, M4 respectively) constituting the pair. The outputs of the differential preamplifiers A13, A24 are linked respectively to the inputs of two phase-shifter channels D13, D24. The phase-shifter channel D13 receives the output signal S13 from the differential preamplifier A13 and applies a phase shift to it depending on the frequency so as to send an output signal SD13. Likewise, the phase-shifter channel D24 receives the output signal S24 from the differential preamplifier A24, and applies a phase-shift to it depending on the frequency so as to send an output signal SD24. Even if the output signals SD13 and SD24 have individually received a phase shift depending on the frequency, the phase-shifter channels D13, D24 are configured in such a way that their respective output signals SD13, SD24 exhibit a phase shift between them which is relatively independent of the frequency. In the example with four microphones described here, this frequency-independent phase shift is equal to 90°.

The phase-shifted output signals SD13, SD24 are addressed to two inputs of the adder circuit 40. The latter sends an output signal ST equal to the sum of the two signals SD13, SD24. This sum ST is thus a combination of the signals output by the four microphones M1, M2, M3, M4 in which a phase shift of 90° exists between the signals output respectively by any two adjacent microphones. In this combination the contributions of the sounds reaching the microphones along the direction of symmetry D, and the effects of symmetric mechanical vibrations are thus eliminated. In contrast, in a plane perpendicular to the direction of symmetry D, this combination ST takes the sound signals into account homogenously, whatever their direction of incidence in this plane. In the preferred application of the apparatus to audioconferencing, the sounds emitted by the speakers are thus taken into account satisfactorily whatever the position of these speakers with respect to the apparatus, whereas the echoes from the loudspeaker are substantially eliminated. Moreover, the arrangement of the microphones M1, M2, M3, M4 in the body 2 and the presence of the pressure areas between this body 2 and the metal plate 20 reflecting the sound waves to a large extent eliminate the indirect echoes reaching the microphones.

In one example which is typical of the sizes, the cylindrical body 2 has an outer diameter of 54 mm, the four microphones are placed on a circumference 13 of 46 mm diameter, the elongation 21 of the body 2 has a diameter of 36 mm and an axial height of about 2 mm defining the spacing 22, and the cavities 12 have a diameter of 6 mm coinciding with that of the microphones and an axial height making it possible to leave a gap 24 of about 3 mm. In this example, the variation in total combined signal for all of the microphones, as a function of the direction of incidence in a plane perpendicular to the direction of symmetry D, is no more than ±0.5 decibel over the whole frequency band corresponding to the telephony frequencies. If this possible frequency band is extended up to 7,000 hertz, a variation of only ±2.5 decibels is observed, which can be further reduced by reducing the dimensions of the microphone mounting assembly.

Figure 4:
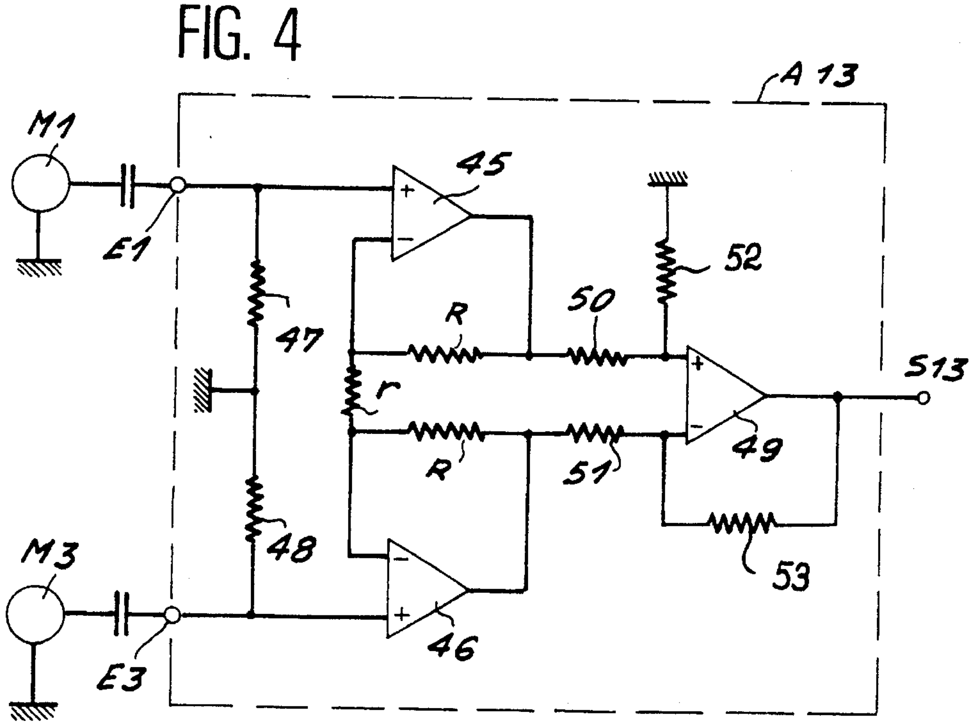
FIG. 4 represents, in a more detailed way, a differential preamplifier used in the processing means represented in FIG. 3.

The detailed structure of the differential preamplifier A13 is represented in FIG. 4, it being understood that the differential amplifier A24 has an identical structure. The inputs E1, E3 of the differential preamplifier A13 are each linked to the positive input terminal of an operational amplifier 45, 46, and are moreover linked together by two resistors 47, 48 mounted in series and having the same ohmic value. The connection point of these two identical resistors 47, 48 is linked to earth. The negative input terminals of the operational amplifiers 45, 46 are linked together by a resistor r. Each of the two operational amplifiers 45, 46 has its output terminal linked by a feedback resistor R to its negative input terminal. The differential preamplifier A13 comprises a third operational amplifier 49, the output of which delivers the output signal S13 of the differential preamplifier A13. The positive input terminal of this third operational amplifier 49 is linked by use of a resistor 50 to the output terminal of the operational amplifier 45, the positive input terminal of which is linked to the microphone M1. The negative input terminal of the third operational amplifier 49 is linked, by use of a resistor 51 having the same ohmic value as the resistor 50 above, to the output terminal of the operational amplifier 46, the positive input terminal of which is linked to the microphone M3. The positive input terminal of the third operational amplifier 49 is moreover linked to earth by use of a resistor 52 having the same ohmic value as the abovementioned resistors 50, 51. The output terminal of the third operational amplifier 49 is moreover linked to its negative input terminal by a feedback resistor 53 having the same ohmic value as the abovementioned resistors 50, 51, 52. FIG. 4 does not represent the feeds from the microphones M1, M3 and of the operational amplifiers 45, 46, 49.

This mounting of the differential preamplifier A13 represented in FIG. 4, produces the desired difference between the output signals of the microphones M1, M3 by moreover eliminating the interference present jointly in these signals. The output signal S13 is given by the following relationship:

$$S13=(E1-E3)\times(1+2R/r),$$

in which E1 and E3 designate the amplitude of the signals received at the input of the. differential preamplifier A13 bearing the same references, and R and r designate the ohmic values of the resistors bearing these same references. The preamplification gain can be chosen to be as large as desired by choosing the ratio 2R/r.

Figure 6:
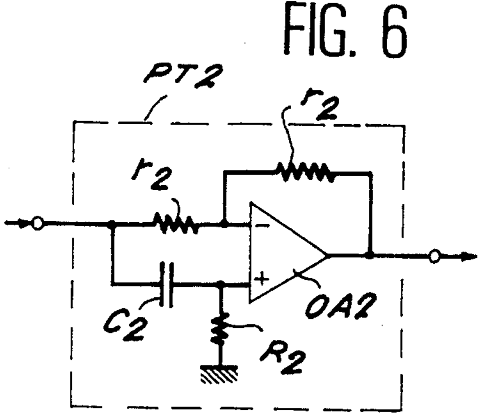
Figure 7:
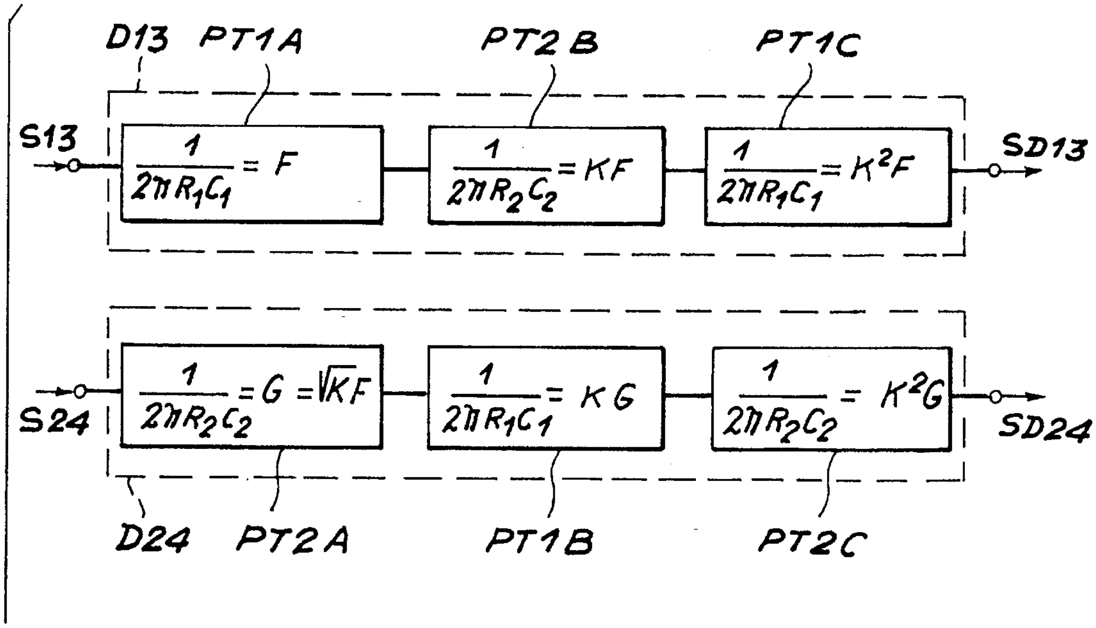
FIG. 7 diagrammatically represents phase-shifter channels used in the processing means of FIG. 3.

The phase-shifter channels D13, D24 are represented diagrammatically in FIG. 7. Each of these phase-shifter channels D13, D24 consists of an association, in alternating series, of all-pass cells of a first type, PT1 (FIG. 5) and of a second type PT2 (FIG. 6), each all-pass cell having a gain equal to 1, independently of the frequency of the voltage signals applied.

Figure 5:
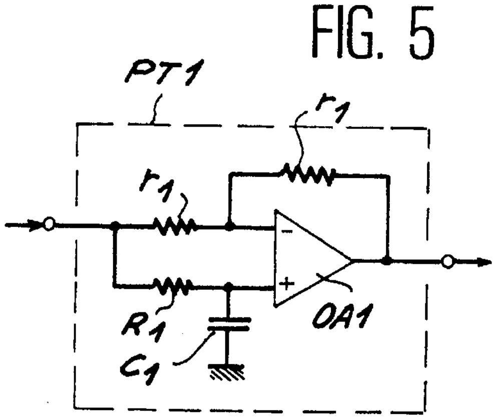
FIGS. 5 and 6 represent the all-pass cells used in the processing means of FIG. 3.

With reference to FIG. 5, an all-pass cell PT1 has its input linked, on the one hand, to the negative input terminal of an operational amplifier OA1 by use of a resistor with ohmic value $r_1$ and, on the other hand, to the positive input terminal of this operational amplifier OA1 by the use of a resistor with ohmic value $R_1$. The output of the all-pass cell PT1 consists of the output terminal of the operational amplifier OA1, which is linked to its negative input terminal by a feedback resistor of ohmic value $r_1$. The positive input terminal of the operational amplifier OA1 is moreover linked to earth by the use of a capacitor of capacitance $C_1$. This all-pass cell PT1, between its output and input signals, introduces a phase shift depending on the frequency of the input signal and lying between 0° for a frequency tending towards zero and 180° for a frequency tending towards infinity. The dependance of this phase shift as a function of the frequency is defined by the values of the resistor $R_1$ and of the capacitor $C_1$, a phase shift of 90° being obtained for a reference frequency $f_1=1/(2\pi R_1C_1)$ of the input signal.

With reference to FIG. 6, an all-pass cell of PT2 type has its input linked, on the one hand, to the negative input terminal of an operational amplifier OA2 by use of a resistor with ohmic value $r_2$, and, on the other hand, to the positive input terminal of this operational amplifier OA2 by use of a capacitor with capacitance $C_2$. The output of the all-pass cell PT2 consists of the output terminal of the operational amplifier OA2 which is linked to its negative input terminal by use of a feedback resistor having an ohmic value $r_2$. The positive input terminal of this operational amplifier OA2 is moreover linked to earth by the use of a resistor with ohmic value $R_2$. The PT2 cell, between its output and input signals, introduces a phase shift depending on the frequency of the input signal and lying between 180° for a frequency tending towards zero and 360° for a frequency tending towards infinity. This dependance of the phase shift as a function of frequency is defined by the values of the resistor $R_2$ and the capacitor $C_2$, a phase shift of 270° being obtained for a reference frequency $f_2=1/(2\pi R_2C_2)$ of the input signal.

As can be seen in FIG. 7, the phase-shifter channel D13 comprises, successively, an all-pass cell PT1A of PT1 type, an all-pass cell PT2B of PT2 type, and an all-pass cell PT1C of PT1 type. Phase-shifter channel D24 comprises, successively, an all-pass cell PT2A of PT2 type, an all-pass cell PT1B of PT1 type, and an all-pass cell PT2C of PT2 type.

For each of the phase-shifter channels D13, D24, the reference frequencies of the successive all-pass cells are in geometric progression with the same ratio K, the first all-pass cell PT1A of the phase-shifter channel D13 having a reference frequency F, and the first all-pass cell PT2A of the phase-shifter channel D24 having a reference frequency $G=K^{1/2}\times F$, in such a way that the reference frequencies of the successive all-pass cells of the phase-shifter channel D24 which commences with an all-pass cell PT2 are respectively equal to the reference frequencies of the successive all-pass cells of the phase-shifter channel D13, which commences with a cell of PT1 type, multiplied by $K^{1/2}$.

With these values, between the output SD13 and input S13 signals of the phase-shifter channel D13, a phase shift D1 is observed, dependent on the frequency f of these signals and, between the output SD24 and input S24 signals of the phase-shifter channel D24, a phase shift D2 of the frequency f of these signals is observed. However, for a component of frequency f common to the input signals S13 and S24, the difference D2–D1 is relatively independent of the frequency f.

Specifically, with $K=e^{\pi}$, the variation in the difference D2–D1 with frequency f will be minimized.

In one illustrative embodiment tested by the applicant, a value F=8 Hz was chosen, with K=23 (close to $e^{\pi}\approx 23.14$). The channels D13, D24 thus constituted then introduce, between their respective output signals SD13, SD14, a difference in phase shifts D2–D1 of 90°±7° for a frequency band lying between 50 Hz and 7,000 Hz. In practice, in the sound acquisition system according to the invention, this variation of ±7° is completely acceptable.

It is noteworthy that with such a small number of cells per channel (3) it is possible to obtain a difference in phase shift D2–D1 which is practically constant over such a wide frequency band. In order further to widen this frequency band for which the difference in phase shifts is practically constant, it is possible to increase the number of all-pass cells per channel, the reference frequencies of the cells of each channel remaining in geometric progression with ratio K.

It will be observed that the order of the all-pass cells mounted in series in the same channel can be modified without departing from the scope of the invention. In fact, the individual phase shifts introduced by the all-pass cells PT1A, PT2B, PT1C or PT2A, PT1B, PT2C add to one another whatever their order of appearance. It suffices for the all-pass cells PT1A, PT2B, PT1C or PT2A, PT1B, PT2C associated in series in each phase-shifter channel D13, D24 to comprise at least one set of all-pass cells which, considered in the increasing order of their reference frequencies, are alternatively of the first PT1 and of the second PT2 type and have reference frequencies in geometric progression according to a ratio K which is identical for both phase-shifter channels D13, D24.

When it is desired to obtain a difference in phase shift d=D2–D1 which is relatively constant between the two channels D13, D24, values are chosen of resistance $R_1$, $R_2$ and of capacitance $C_1$, $C_2$ of the all-pass cells of different types, PT1A, PT2A, having the lowest reference frequency in each of the channels D13, D24, in such a way that the reference frequencies $F=1/(2\pi R_1C_1)$ and $G=1/(2\pi R_2C_2)$ of these cells PT1A, PT2A are in a ratio $G/F=K^{1-(d/180)}$, d being expressed in degrees. For example, in order to obtain a phase shift of 360°/2n between the output signals of the phase-shifter channels D13, D24, $G/F=K^{1-1/n}$ will be chosen.

It will be understood that various configurations of microphones can be used in the context of the present invention. Possible variants are given in a non-limiting way in FIGS. 8 to 11, which are sectional views similar to FIG. 2.

In the example represented in FIG. 8, six microphones 100 are used arranged geometrically at the vertices of a regular hexagon centered on the direction of symmetry D. These six microphones 100 can also be associated in pairs, each consisting of two microphones which are diametrically opposite with respect to the direction D, the output signals of the two microphones of each pair being subtracted from one another as described previously. The phase-shifter channels are then configured to apply a phase shift of 60° between the signal obtained by subtraction relative to each pair of microphones 100, which makes it possible to obtain substantially the same advantages as in the example with four microphones described with reference to FIGS. 1 to 7. In a general way, n pairs of sound reception devices can be provided, situated at regular intervals along a circumference 13 centered on the direction of symmetry D, n designating a whole number at least equal to two, the processing means 8 being then configured to apply a phase shift of 360°/2n between the signals output respectively from any two adjacent sound reception devices.

In the example represented in FIG. 8, it is again seen that the metal body 102 in which the cavities 112 accommodating the various microphones 100 are machined can have a general shape which is different from the previously described cylindrical shape. In this example, the diameter of the lower elongation 121 of the body 102 is kept over the whole height of the body 102, and the latter in its part situated above the elongation 121, includes six radial protuberances in which the six cavities 112 accommodating the microphones 100 are respectively machined. Hence, the pressure regions defined between the upper metal plate 20 of the box 1 and the part of the body 102 accommodating each microphone 100 are defined spatially in a more clear-cut way.

Another possible variant of the geometric shape of the body 202 consists of the example with four microphones M1, M2, M3, M4 represented in FIG. 9. In this example, the part of the body 202 situated above its lower elongation 221 has a regular polygonal shape centered on the direction of symmetry D, the circular contour of the elongation 221 lying within this regular polygon (this polygon is a square in an example with four microphones). Then the cavities accommodating the microphones M1, M2, M3, M4 are machined in the parts of the square which extend outside the circular shape defined by the elongation 221.

As in the example described with reference to FIGS. 1 to 7, the variant represented in FIG. 10 relates to a system with four sound acquisition devices 300. In this variant, each sound acquisition device 300 consists of several microphones 301 (two in the example represented), situated in proximity to one another. The body 302 thus includes eight cavities arranged symmetrically with respect to the direction of symmetry D so as to accomodate the eight microphones 301. The processing means 8 then include four supplementary adder circuits (not represented) for adding the two signals, in phase, output respectively by the two microphones 301 making up each of the sound reception devices 300. The rest of the processing means 8 is identical to what was described with reference to FIG. 3, the output signals from the four supplementary adder circuits thus constituting the four signals addressed to the inputs of the differential preamplifiers A13, A24.

In the example represented in FIG. 11, it is seen that the method according to the present invention can also be employed with an odd number (three) of microphones 400.

The three microphones are then situated in the body 402 along three radial lines which are coincident at their intersection with the direction of symmetry D and forming angles of 120° between them. In this case, the processing means 8 do not include differential preamplifiers mounted immediately at the output of the microphones 400. Phase-shifter channels have to be used applying a phase shift of 120° between the signals output by any two microphones 400, before adding the signals thus phase-shifted. In the output signal obtained by adding these three signals phase-shifted by 120°, a low or zero sensitivity is also observed to sounds incident along the direction of symmetry D, and a relatively regular sensitivity to the sounds incident in a plane perpendicular to this direction D.

Figure 12:
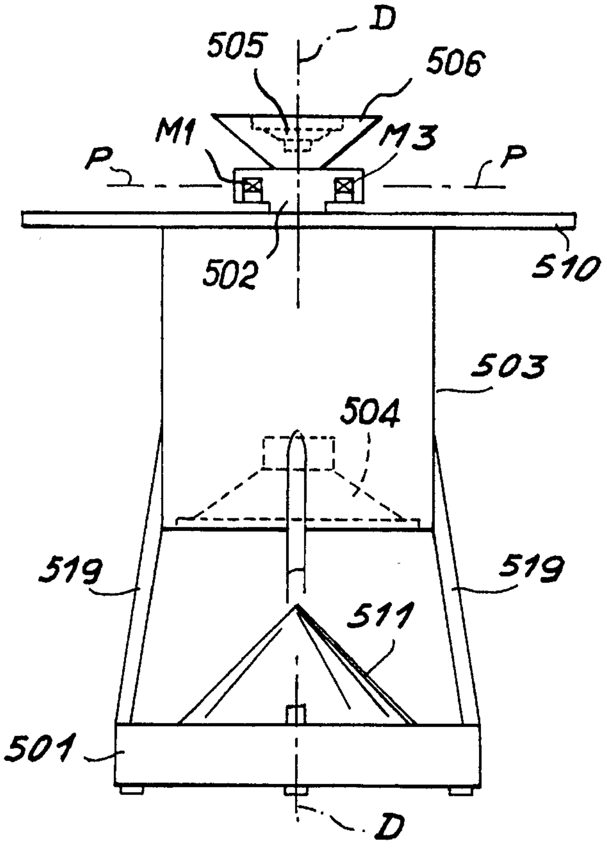
FIG. 12 represents an overall diagrammatic view of another variant of the present invention.

In FIG. 12, a diagrammatic view in elevation has been represented of a variant embodiment of the sound acquisition and reproduction apparatus according to the invention. The base of the apparatus consists of the box 501 containing the various electrical circuits of the apparatus. The apparatus comprises a main loudspeaker 504 oriented along the direction of symmetry D and an auxiliary treble loudspeaker 505 of smaller dimensions (tweeter). The two loudspeakers 504, 505 are arranged back to back so as to emit in opposite senses along the direction D. The plane P in which the microphones M1 to M4 are situated extends between the two loudspeakers 504, 505, in such a way that the microphones receive practically no sound direct from the loudspeakers 504, 505. The element 503 forming a sounding box for the main loudspeaker 504 has a generally cylindrical shape centered on the direction of symmetry D and is mounted on the box 501 by means of four uprights 519, through which pass the wires for connecting the loudspeakers 504, 505 and the microphones. A cone-shaped element 511 is fixed to the upper face of the box 501, the cone being axisymmetric around the direction of symmetry D and pointing towards the main loudspeaker 504. The main loudspeaker 504 is oriented downwards towards the cone 511 and the sounds which it emits are thus reflected laterally by the cone 511, with a regular distribution in a horizontal plane. The body 502 in which the microphones are housed is arranged on the side opposite the cone-shaped element 511 with respect to the main loudspeaker 504. The configuration of the microphones in the body 502 is similar to that described with reference to FIGS. 1 and 2, with a planar metal plate reflecting the sound waves 510 separating the element 503 forming a sounding box for the main loudspeaker 504 and the block 502 accommodating the microphones. The processing of the microphone signals is identical to that previously described. The auxiliary loudspeaker 505 is mounted in an element 506 forming a sounding box. This element 506 is of a frustoconical shape axisymmetric about the direction of symmetry D. Its smaller cross-sectional side is fixed to the upper part of the body 502 accommodating the microphones, and its larger cross-sectional side, like the tweeter 505, is turned upwards.

This configuration illustrated in FIG. 12 confers excellent effectiveness on the main loudspeaker 504 since the cone 511 homogenously directs the sound towards the listeners. Moreover, the effectiveness of the microphones is enhanced as the latter are situated towards the upper part of the apparatus in such a way that, when the latter is standing on a table, the microphones are placed at a higher level (for example by 30 cm) than that of the table, that is to say at a level advantageously close to the mouths of the speakers when the latter are seated around the table. Finally, the presence of an auxiliary treble loudspeaker enhances the quality of sound reproduction.

Needless to say, sundry other variants of the invention will be apparent to the person skilled in the art on reading the present specification. The invention is thus not limited to the embodiments described above by way of example.

I claim:

1. A sound acquisition system comprising a number n greater than 2 of sound receiving devices (M1 to M4; 100; 300; 400) arranged, at regular intervals, over a circumference (13) centered with respect to a direction of symmetry (D), and processing means (8) for processing the signals generated from said sound receiving devices, characterized in that the sound receiving devices comprise microphones (M1, M2, M3, M4; 100; 301; 400) arranged in a same plane (P) perpendicular to said direction of symmetry (D), each microphone being arranged in one of a plurality of cavities (12; 112) open on one side (23) facing a planar plate (20; 510) reflecting sound waves and disposed in parallel to said plane (P) in which said sound receiving devices are arranged.

2. A sound acquisition and reproduction apparatus according to claim 1, wherein said processing means (8) comprise means for applying a phase shift equal to 360° divided by n between the signals output respectively by any two adjacent sound reception devices, and for adding the signals thus phase shifted in such a way as to obtain a substantially uniform and non-attenuated reception of signals relating to the components parallel to the plane (P) irrespective of the direction of the waves and substantially zero reception of the signals relating to the components parallel to the straight line of symmetry (D) of the acoustic waves picked up.

3. The system as claimed in claim 2, wherein said sound reception devices (M1 to M4; 100; 300) are even in number, m=2n greater than 3, and are associated two by two, in n pairs, the sound reception devices of each of said pairs being arranged symmetrically with respect to the direction of symmetry (D), the processing means (8) being configured so that the signals output respectively by the reception devices of each pair are subtracted from one another in order to add them with a phase shift of 180° between them, a phase shift being applied to each signal (S13, S14) output by a pair in order to obtain a phase shift of 360°/m between the signals output respectively by any two adjacent pairs of sound reception devices, the signals thus phase shifted then being added.

4. The system as claimed in claim 3, wherein the processing means (8), for each pair of sound reception devices (M1 to M4; 100; 300; 400) comprise a differential preamplifier (A13 and A24) including two inputs (E1, E3 and E2, E4) respectively receiving the signals output by the two sound reception devices (M1 to M4; 100, 300) of the pair, and an output supplying the amplified difference (S13 and S24) between the two signals received at the inputs (E1 to E4).

5. The system as claimed in claims 3 wherein, in order to apply the phase shift of 360°/m between the signals output respectively by any two adjacent sound reception devices, the processing means (8) comprise n phase-shifter channels (D13, D24) each including an input receiving a signal (S13, S24) output by one of said pairs and an output (SD13, SD24), the n outputs of the phase-shifter channels being added to constitute the signal output by the sound acquisition system.

6. The system as claimed in claim 5, wherein each phase-shifter channel (D13, D24) comprises an association, in series, of several all-pass cells (PT1A, PT2B, PT1C; PT2A, PT1B, PT2C) belonging to two types of all-pass cells (PT1, PT2), wherein a first type of all-pass cell (PT1)

comprises a resistor ($R_1$) and a capacitor ($C_1$), the values of which determine the dependency of an elementary phase shift supplied by the all-pass cell (PT1) between its output signal and its input signal as a function of the frequency of its input signal, this elementary phase shift lying between 0° and 180° and being substantially equal to 90° for a reference frequency $f_1=1/(2\pi R_1C_1)$ of the all-pass cell (PT1), wherein a second type of all-pass cell (PT2) comprises a resistor ($R_2$) and a capacitor ($C_2$) the values of which determine the dependency of an elementary phase shift supplied by the all-pass cell (PT2) between its output signal and its input signal as a function of the frequency of its input signal, this elementary phase shift lying between 180° and 360° and being substantially equal to 270° for a reference frequency $f_2=1/(2\pi R_2C_2)$ of the all-pass cell (PT2), and wherein the all-pass cells associated in series in each phase-shifter channel (D13, D24) comprise at least one set of all-pass cells (PT1A, PT2B, PT1C; PT2A, PT1B, PT2C) which, considered in the increasing order of their reference frequencies, are alternatively of the first (PT1) and of the second (PT2) type and have reference frequencies (F, KF, $K^2$F; G, KG, $K^2$G) substantially in geometric progression according to a ratio (K) which is identical for both phase-shifter channels (D13, D24).

7. The system as claimed in claim 6, wherein the ratio (K) of the geometric progressions is approximately equal to $e^{\pi}$.

8. The system as claimed in claims 5 wherein two all-pass cells (PT1A, PT2A) of different types belonging to two distinct phase-shifter channels (D13, D14) have respective reference frequencies (F, G), the ratio (G, F) of which is substantially equal to $K^{1-(d/180)}$, K designating the ratio of the geometric progressions and designating a predetermined value expressed in degrees equal to a desired difference between the phase shifts (D1, D2) applied respectively by the two phase-shifter channels (D13, D24).

9. The system as claimed in claims 6, wherein the number of all-pass cells per phase-shifter channel (D13, D24) is equal to 3.

10. The system as claimed in 2, wherein each sound reception device comprises a single microphone (M1 to M4; 100; 300; 400).

11. The system as claimed in claim 10, wherein each sound reception device (300) consists of several microphones (301), and wherein the processing means (8) comprise means for adding the signals, in phase, output respectively by the microphones (301) constituting each sound reception device (300) in order to establish the output signal of this sound reception device (300).

12. A sound acquisition and reproduction apparatus according to claim 11, wherein a frequency band of said output signal can be extended to include telephony frequency bands by reducing the dimensions of the microphone mounting assembly.

13. The system as claimed in claim 1, wherein the cavities (12; 112) in which the said microphones (M1 to M4; 100; 301; 400) are housed are formed in a body (2; 102; 202; 302; 402; 502) of symmetric shape with respect to said direction of symmetry (D) and including, on the same side as said planar plate (20; 510) reflecting the sound waves, an elongation (21; 121; 221) for defining a defined spacing d (22) between the cavities (12; 112) and said plate (20; 510).

14. The system as claimed in claims 1, wherein each microphone (M1 to M4; 100; 301; 400) is set into its respective cavity (12; 112) in such a way as to leave a gap (24) between a side of this microphone facing the planar plate (20; 510) reflecting the sound waves and an edge (23) of this cavity (12; 112) facing said plate (20; 510).

15. The system as claimed in claims 1 wherein it exhibits a generally symmetric structure about the direction of symmetry.

16. A sound acquisition and reproduction apparatus, wherein said sound reproduction means comprises at least one loudspeaker (4; 504, 505), and wherein said sound acquisition means comprises a number n greater than 2 of sound receiving devices (M1 to M4; 100; 300; 400) and arranged, at regular intervals, over a circumference (13) centered with respect to a direction of symmetry (D), and processing means (8) for processing the signals generated from said sound receiving devices, characterized in that the sound receiving devices comprise microphones (M1, M2, M3, M4; 100; 301; 400) arranged in a same plane (P) perpendicular to said direction of symmetry (D), each microphone being arranged in one of a plurality of cavities (12; 112) open on one side (23) facing a planar plate (20; 510) reflecting sound waves and disposed in parallel to said plane (P) in which said sound receiving devices are arranged, said sound reproduction means being arranged on the axis of symmetry (D) in such a way that said sound acquisition and reproduction apparatus exhibits a generally symmetric structure about said direction of symmetry (D).

* * * * *